(12) United States Patent
Cho et al.

(10) Patent No.: US 7,120,440 B2
(45) Date of Patent: Oct. 10, 2006

(54) VELOCITY ESTIMATION APPARATUS AND METHOD USING LEVEL CROSSING RATE

(75) Inventors: Myeon-Gyun Cho, Songnam-shi (KR); Daesik Hong, Seoul (KR)

(73) Assignees: Samsung Electronics Co., Ltd., (KR); Yonsei University, (KR)

( * ) Notice: Subject to any disclaimer, the term of this patent is extended or adjusted under 35 U.S.C. 154(b) by 272 days.

(21) Appl. No.: 10/822,130

(22) Filed: Apr. 9, 2004

(65) Prior Publication Data

US 2004/0235479 A1  Nov. 25, 2004

(30) Foreign Application Priority Data

May 23, 2003  (KR) ................. 10-2003-0032819

(51) Int. Cl.
*H04Q 7/20*  (2006.01)
(52) U.S. Cl. ............... 455/441; 455/553.1; 455/130; 455/67.11; 455/136; 375/130; 375/285; 375/222; 600/454; 702/142
(58) Field of Classification Search ........... 455/441, 455/553.1, 130, 62.11, 136; 600/454; 702/142; 375/130, 285, 222
See application file for complete search history.

(56) References Cited

U.S. PATENT DOCUMENTS

| | | | |
|---|---|---|---|
| 5,748,677 A * | 5/1998 | Kumar | 375/285 |
| 5,825,807 A * | 10/1998 | Kumar | 375/130 |
| 6,246,885 B1 * | 6/2001 | Black et al. | 455/553.1 |
| 6,272,168 B1 * | 8/2001 | Lomp et al. | 375/222 |
| 6,377,607 B1 * | 4/2002 | Ling et al. | 375/130 |
| 6,529,850 B1 * | 3/2003 | Wilborn et al. | 702/142 |
| 2002/0138229 A1 * | 9/2002 | Wilborn et al. | 702/142 |
| 2005/0020219 A1 * | 1/2005 | Sih et al. | 455/130 |

FOREIGN PATENT DOCUMENTS

| WO | WO 01/99303 | 12/2001 |
|---|---|---|
| WO | WO 03/036813 | 5/2003 |

\* cited by examiner

*Primary Examiner*—Joseph Feild
*Assistant Examiner*—David Q. Nguyen
(74) *Attorney, Agent, or Firm*—Dilworth & Barrese LLP

(57) ABSTRACT

Disclosed is a velocity estimator using a level crossing rate. The velocity estimator comprises a power calculator for calculating power values of a signal received from a mobile terminal; a mean power calculator for calculating mean power values for M power values according to a predetermined down-sampling factor M; an interpolator for interpolating the mean power values according to a predetermined interpolation ratio L; a root mean square calculator for calculating a root mean square value using an output of the interpolator; a level crossing counter for counting a level crossing frequency representing how many times the output of the interpolator crosses a level crossing threshold determined according to the root mean square value, for a predetermined time period; and a velocity calculator for calculating a velocity estimation value of the mobile terminal using the level crossing frequency.

23 Claims, 12 Drawing Sheets

VELOCITY ESTIMATION APPARATUS AND METHOD USING LEVEL CROSSING RATE

PRIORITY

This application claims priority under 35 U.S.C. § 119 to an application entitled "VELOCITY ESTIMATION APPARATUS AND METHOD USING LEVEL CROSSING RATE" filed in the Korean Intellectual Property Office on May 23, 2003 and assigned Serial No. 2003-32819, the contents of which are incorporated herein by reference.

BACKGROUND OF THE INVENTION

1. Field of the Invention

The present invention relates generally to wireless communication technology, and in particular, to an apparatus and method for estimating velocity of a moving object such as a mobile terminal.

2. Description of the Related Art

A $4^{th}$ generation (4G) mobile communication system aims at supporting a dual mode functionality in which a mobile service by International Mobile Telecommunications 2000 (IMT2000) is unified with a fixed service by Wireless Location Access Network (WLAN). The $4^{th}$ generation system adaptively assigns the mobile service and the fixed service to a user in such a way that it supports a high-capacity service in a fixed mode when the user's operation environment is excellent, whereas it supports a service in a mobile mode when the user's operation environment is poor.

Efficient management of a service mode must be continuously performed not only during initial access, but also during communication. To this end, an algorithm for efficiently performing initial mode selection, handoff and link adaptation of the mobile service and the fixed service is required. In particular, an adaptive modulation and coding scheme (AMCS), one of typical technologies for link adaptation, selects a modulation/coding scheme by determining parameters capable of indicating a user's operation environment and then estimating the values: The parameters indicating a user's operation environment are used as information for handoff between different modes and resource assignment of the adaptive modulation/coding scheme. For dynamic assignment of resources, accurate estimation for a user's operation environment is necessary.

In a wireless communication system, velocity information of a mobile terminal is an important parameter indicating a user's operation environment, and can improve system performance when it is actually applied. When applied to adaptive transmission/reception technology, velocity information of the mobile terminal enables a receiver to perform more efficient channel estimation and a transmitter to adjust a modulation/coding or interleaving scheme according to a channel condition. In addition, based on the velocity information of thea mobile terminal, the system can accurately determine whether to perform handoff or not, and a handoff time, and can efficiently manage system resources.

Such a velocity estimation scheme used in various application fields is classified into a level crossing rate (LCR) estimation scheme and a covariance (COV) estimation scheme. The level crossing rate estimation scheme estimates velocity using how many times an envelope, i.e., power, of a received signal crosses a predetermined reference level during a predetermined time period, i.e., the number of level crossings. The covariance estimation scheme estimates velocity of the mobile terminal, using a covariance value between received samples having a predetermined time difference.

Of the velocity estimation schemes, the covariance estimation scheme has a sensitive performance difference according to variation in channel environment parameters such as a Rician factor and an incidence angle of Line of Sight (LOS). In a micro-cell environment, it is difficult to stably use the covariance estimation scheme when Rician fading is considered. Compared with the covariance estimation scheme, the level crossing rate estimation scheme uses a level crossing rate which is a secondary statistical characteristic of an envelope fading and, for 2-dimensional isotropic scattering, velocity of a mobile can be calculated irrespective of a Rician fading characteristic.

However, since the conventional level crossing rate estimation scheme uses only a channel characteristic without considering an influence of noises, accuracy of velocity estimation is lowered undesirably in a noisy environment where a signal-to-noise ratio (SNR) is decreased. Thus, there is a need for a method of improving accuracy of velocity estimation when a level crossing rate is used in a low-SNR environment.

SUMMARY OF THE INVENTION

It is, therefore, an object of the present invention to provide a velocity estimation apparatus and method for improving accuracy of velocity estimation based on a level crossing rate.

It is another object of the present invention to provide a velocity estimation apparatus and method for minimizing an influence of noises in estimating velocity of a mobile depending on a level crossing rate.

According to one aspect of the present invention, there is provided a velocity estimator using a level crossing rate. The velocity estimator comprises a power calculator for calculating power values of a signal received from a mobile terminal; a mean power calculator for calculating mean power values for M power values according to a predetermined down-sampling factor M; an interpolator for interpolating the mean power values according to a predetermined interpolation ratio L; a root mean square calculator for calculating a root mean square value using an output of the interpolator; a level crossing counter for counting a level crossing frequency representing how many times the output of the interpolator crosses a level crossing threshold determined according to the root mean square value, for a predetermined time period; and a velocity calculator for calculating a velocity estimation value of the mobile terminal using the level crossing frequency.

According to another aspect of the present invention, there is provided a velocity estimator using a level crossing rate. The method comprises the steps of calculating power values of a signal down-sampled with a signal received from a mobile terminal; interpolating the power values according to a predetermined interpolation ratio; calculating a root mean square value using the interpolated values, wherein the root mean square value becomes a level crossing threshold; counting a level crossing frequency representing how many times the interpolated values cross the level crossing threshold for a predetermined time period; and calculating a velocity estimation value of the mobile terminal using the level crossing frequency.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will now be described in detail with reference to the annexed drawings. In the following description, a detailed description of known functions and configurations incorporated herein has been omitted for conciseness. The terms used herein are defined in consideration of their functions in the invention, and can be changed according to users, operator's intentions, and usual practices. Therefore, the definition should be made based on the overall contents of the specification.

Herein, a detailed description of the invention will be made with reference to a cellular wireless communication system employing code division multiple access (CDMA) signal processing technology for an effective, robust (or noiseless) communication service. However, efficient velocity estimation technology, a main object of the present invention, can be applied even to other technical fields having the similar technical background and channel type with a slight modification, without departing from the spirit and scope of the invention, and this would be obvious to those skilled in the art.

Figure 1:
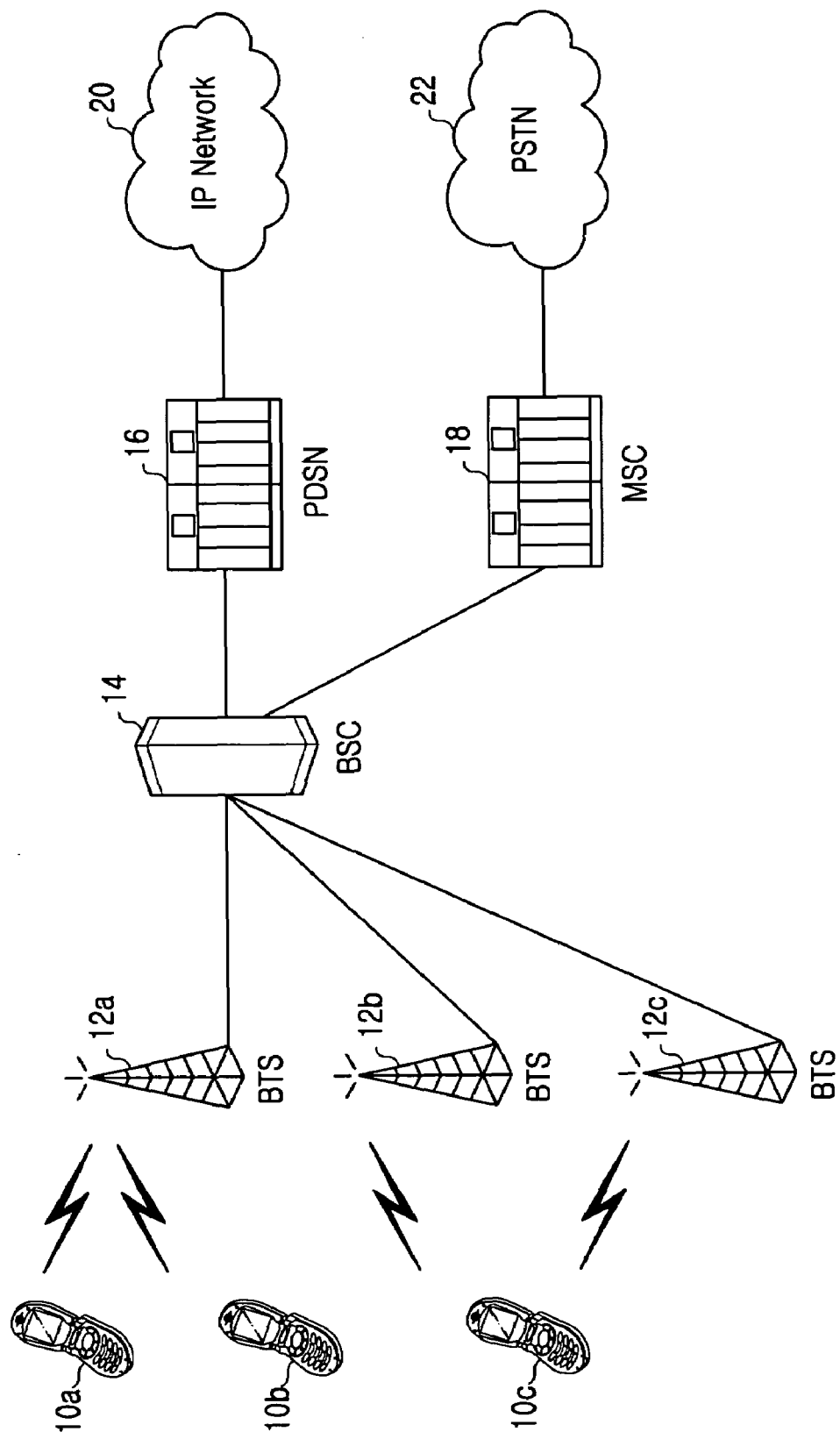
FIG. 1 illustrates a simplified configuration of a typical wireless communication system to which the present invention is applied.

FIG. 1 illustrates a simplified configuration of a typical wireless communication system to which the present invention is applied. Referring to FIG. 1, the wireless communication system includes a plurality of mobile terminals 10a, 10b and 10c, a plurality of base transceiver subsystems (BTSs) 12a, 12b and 12c, a base station controller (BSC) 14, a packet data serving node (PDSN) 16, a mobile switching center (MSC) 18, an Internet protocol (IP) network 20, and a public switched telephone network (PSTN) 22.

It is preferable that the mobile terminals 10a to 10c are constructed to process one or more wireless packet data protocols in supporting a packet data service. In one embodiment, the mobile terminals 10a to 10c can create IP packets to be transmitted to the IP network 20 and encapsulate the IP packets with frames that use a point-to-point protocol (PPP). The IP network 20 is connected to the packet data serving node 16, and the packet data serving node 16 is connected to the base station controller 14. The base station controller 14 is connected to the base transceiver subsystems 12a to 12c so constructed as to transmit voice and/or data packets via a wireless channel using the mobile terminals 10a to 10c and known various protocols. In addition, the base station controller 14 is connected to the public switched telephone network 22 via the mobile switching center 18, and provides a typical telephone call service to the mobile terminals 10a to 10c via the base transceiver subsystems 12a to 12c.

In the case of a typical telephone call, the base station controller 14 routes received data to the mobile switching center 18 that provides an additional routing service for interfacing with the public switched telephone network 22. In the case of a data call for packet-based transmission, the base station controller 14 routes a data packet to the packet data serving node 16 so that the data packet arrives at the IP network 20.

In typical operation, the base transceiver subsystems 12a to 12c demodulate reverse link signals received from the mobile terminals 10a to 10c, which are performing a telephone call, web browsing or other data communication. The respective reverse link signals are processed by the base transceiver subsystems 12a to 12c. Each of the base transceiver subsystems 12a to 12c communicates with a plurality of the mobile terminals 10a to 10c by demodulating forward link signals and transmitting the demodulated signals to the mobile terminals 10a to 10c. For example, a first base transceiver subsystem 12a simultaneously communicates with first and second mobile terminals 10a and 10b, and second and third base transceiver subsystems 12b and 12c simultaneously communicate with the third mobile terminal 10c due to a soft handoff. The base station controller 14 controls handoffs from one base transceiver subsystem to another base transceiver subsystem for a particular mobile terminal (any one of the mobile terminals 10a to 10c).

Each of the base transceiver subsystems 12a to 12c stores a table of gains dB and pilot channel power levels for the mobile terminals 10a to 10c in order to specify a traffic channel power level for the mobile terminals 10a to 10c. The table includes a data rate based on bits per second (bps), a target frame error rate (FER), a type of a forward error correction code, for example, convolutional code or turbo code, gains for each combination of frame lengths, for example, 5 ms, 20 ms, 40 ms and 80 ms, and different combinations of pilot levels. The gains dB are a ratio of a pilot channel power level to a traffic channel power level. The different combinations of pilot levels correspond to a given velocity range for a mobile terminal (any one of the mobile terminals 10a to 10c). Velocity of a mobile terminal is estimated by a method using a level crossing rate, which will be described later. The reason for using a plurality of gains as stated above is because a ratio (or gain) of pilot to traffic for a given target frame error rate is changed according to velocity of a mobile terminal. For example, three different combinations can be used which correspond to three velocity ranges, i.e., stop (0 Km per hour), low velocity (for example, 30 Km per hour or lower) and high velocity (for example, 30 Km per hour or higher).

Particularly, in a 4$^{th}$ generation mobile communication system supporting a dual mode in which a mobile service mode is unified with a fixed service mode, velocity of a mobile terminal is usefully used for mode switching between the mobile service mode and the fixed service mode, model selection, and an adaptive modulation/coding scheme.

Figure 2:
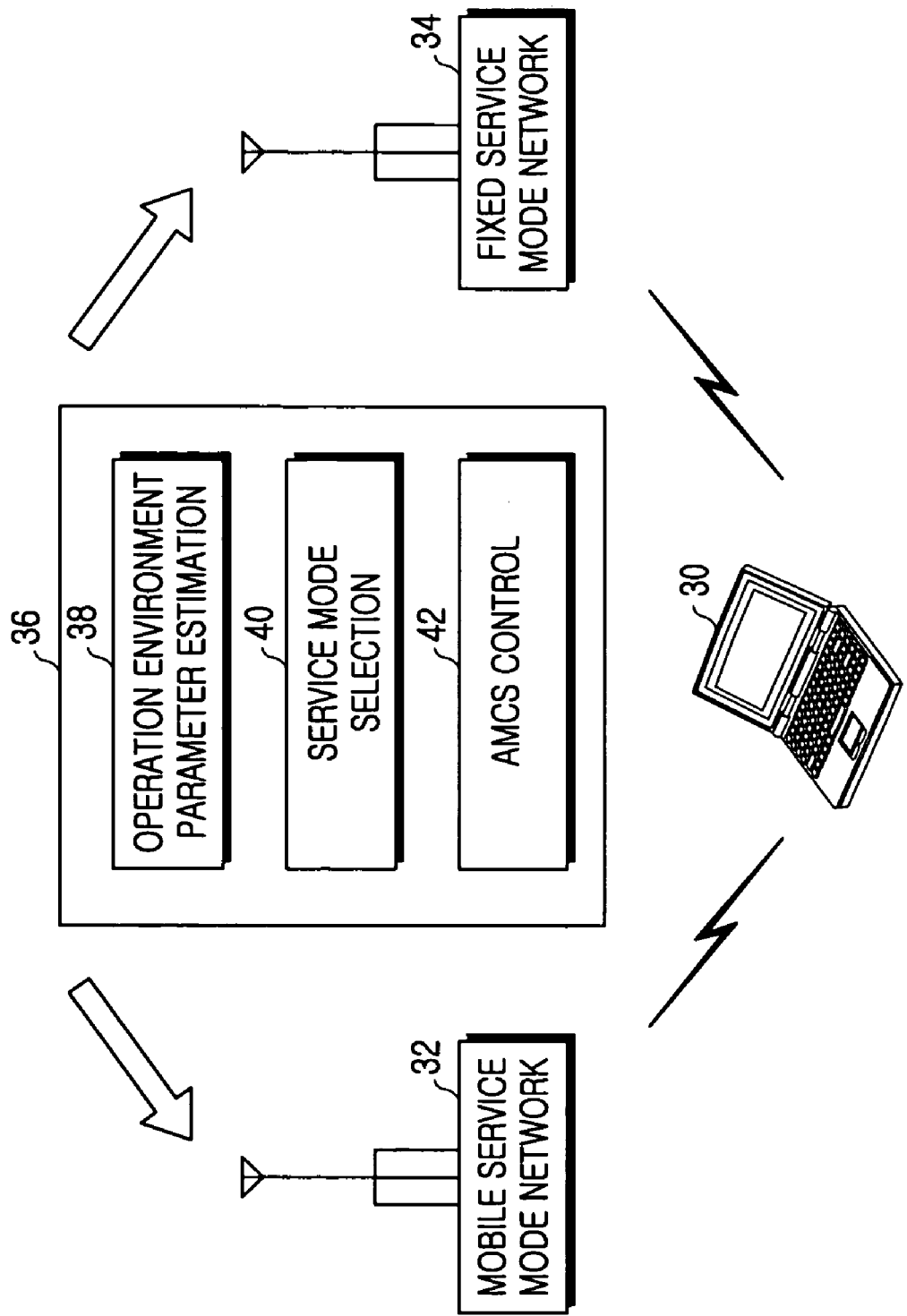
FIG. 2 is a block diagram for describing a method of performing handoff and an adaptive modulation/coding scheme between different modes using operation environment estimation information.

FIG. 2 is a simplified block diagram for describing a method of performing a handoff and an adaptive modulation/coding scheme between different modes, using operation environment estimation information. A mobile terminal 30 is a dual-mode terminal designed to be able to perform mode selection and switching between a mobile service mode and a fixed service mode and can communicate with a mobile service mode network 32 or a fixed service mode network 34 via a wireless channel. An operation environment estimation system 36 is comprised of a block 38 for estimating operation environment parameters such as velocity for the mobile terminal 30, a block 40 for selecting a service mode during initial network access and performing service mode switching during handoff, and an AMCS control block 42 for adaptively selecting a modulation and coding scheme.

The operation environment estimation system 36 has been described with reference to an embodiment where the mobile service mode network 32 is separated from the fixed service mode network 34, for the convenience of explanation. However, in an alternative embodiment, the blocks 38, 40 and 42 for operation environment estimation can be constructed to be included in any one or both of the respective mode networks 32 and 34, and this can be easily understood by those skilled in the art.

Velocity of a mobile terminal is one of a number of important operation environment parameters. Estimation of velocity can be achieved by using power measured on a single wireless path during a given time period. Velocity of a mobile terminal can be estimated from how many times a power level crosses a specific level in a positive direction (or negative direction) for a given time period, hereinafter referred to as "level crossing frequency" or "level crossing rate".

In realizing such a velocity estimator, it is difficult to accurately measure multipath power. Since a level crossing rate algorithm for velocity estimation requires knowledge of multipath reception power, multipath power must be isolated from the total reception power. Even though multipath power must be isolated from the total reception power, an influence of automatic gain control raises another problem. Automatic gain control prevents a mobile terminal from acquiring information necessary for estimating reception power, since it properly maintains an envelope of a received signal. If accurate power estimation of a received signal has failed, it is not possible to accurately perform velocity estimation using a level crossing rate.

Figure 3:
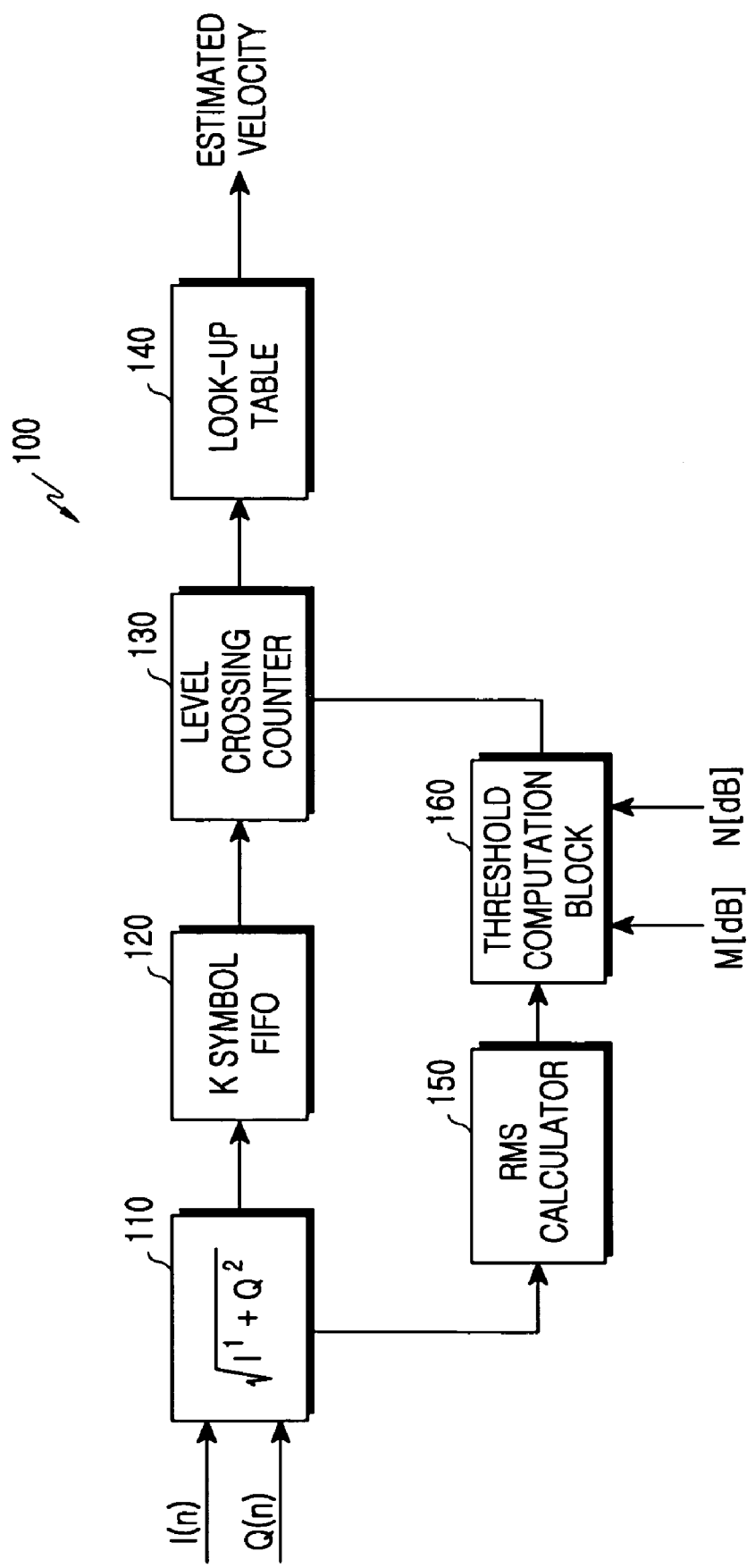
FIG. 3 illustrates a typical velocity estimator using a level crossing rate.

An example of a typical velocity estimator for solving such a problem is illustrated in FIG. 3. A velocity estimator 100 is included in a mobile terminal (such as for example, a cellular phone, a portable digital device, a portable computer connected to the cellular phone, etc.) operating in a cellular mobile communication system. A received in-phase signal I(n) and a received quadrature-phase signal Q(n) are provided to a power calculator 110. Here, n is a discrete time index. The provided signals are signal samples obtained by sampling corresponding signals, a Pseudo-random Noise (PN) despreading the sample signals and accumulating the PN-despread signals for a predetermined time period. The power calculator 110 calculates a square root $\sqrt{I^2+Q^2}$ of signal energy, i.e., a power value, by taking a square root for the sum of squares of the signals. The power values calculated by the power calculator 110 are provided to a Root Mean Square (RMS) calculator 150 at stated periods.

The RMS calculator 150 calculates a running root mean square using a predetermined number (for example K) of consecutive power values. A threshold computation block 160 uses predetermined hysteresis values M and N in order to calculate high and low level crossing thresholds.

The calculated power values are stored in a FIFO (First In First Out) buffer 120. A size of the FIFO buffer 120 is determined according to the number of symbols used in the RMS calculation. A level crossing counter 130 counts a frequency indicating how many times symbol outputs from the FIFO buffer 120 consecutively cross the calculated high and low thresholds. In the level crossing counter 130, the frequency becomes a level crossing frequency. A look-up table 140 maps a velocity estimation value to a level crossing frequency for a predetermined time period. The velocity estimation value is output directly from the look-up table 140.

Figure 4:
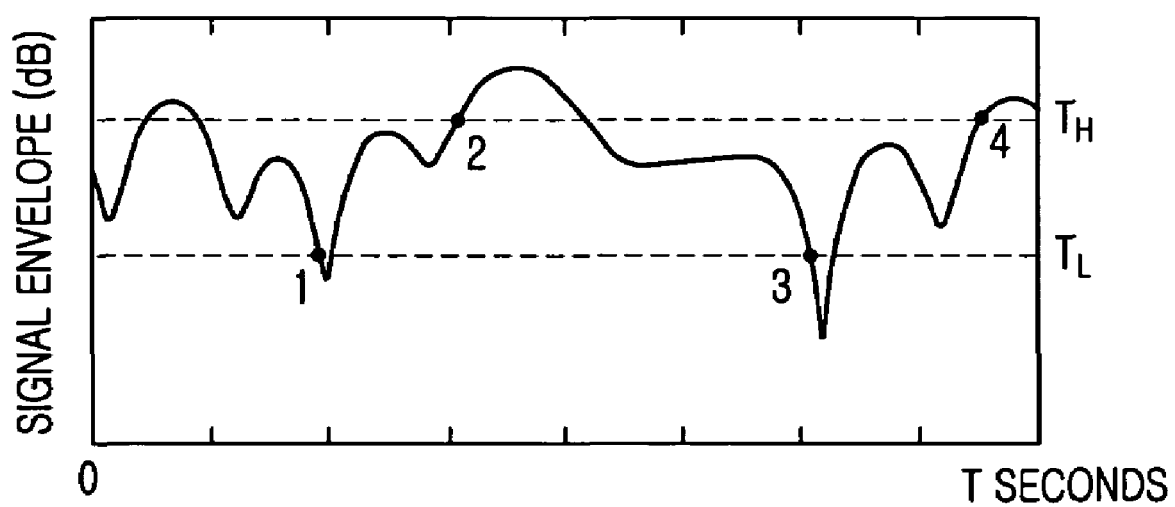
FIG. 4 illustrates an operation of counting a level crossing frequency for a multipath signal in a noisy environment by the velocity estimator of FIG. 3.

FIG. 4 illustrates an operation of counting a level crossing frequency for a multipath signal in a noisy environment by the velocity estimator 100 of FIG. 3. Here, a high threshold is marked by $T_H$, while a low threshold is marked by $T_L$. Though not illustrated, the high and low thresholds are set to power levels higher and lower than a common level crossing threshold by MdB, respectively. According to illustrated variation in signal power, a level crossing frequency is counted at points 1, 2, 3 and 4.

The velocity estimator 100 of FIG. 3 removes an influence of noises to some extent by using hysteresis values. However, in a low signal-to-noise ratio (SNR) environment, the velocity estimator 100 still cannot obtain accuracy to a satisfactory level. Therefore, the invention maximally removes an influence of noises from received signals by down-sampling received signal samples so that Doppler power spectrum density of signal power is maximally increased to such a level that no aliasing occurs, i.e., while satisfying a sampling theorem, and then counting a level crossing frequency using the down-sampled signal samples.

Figure 5:
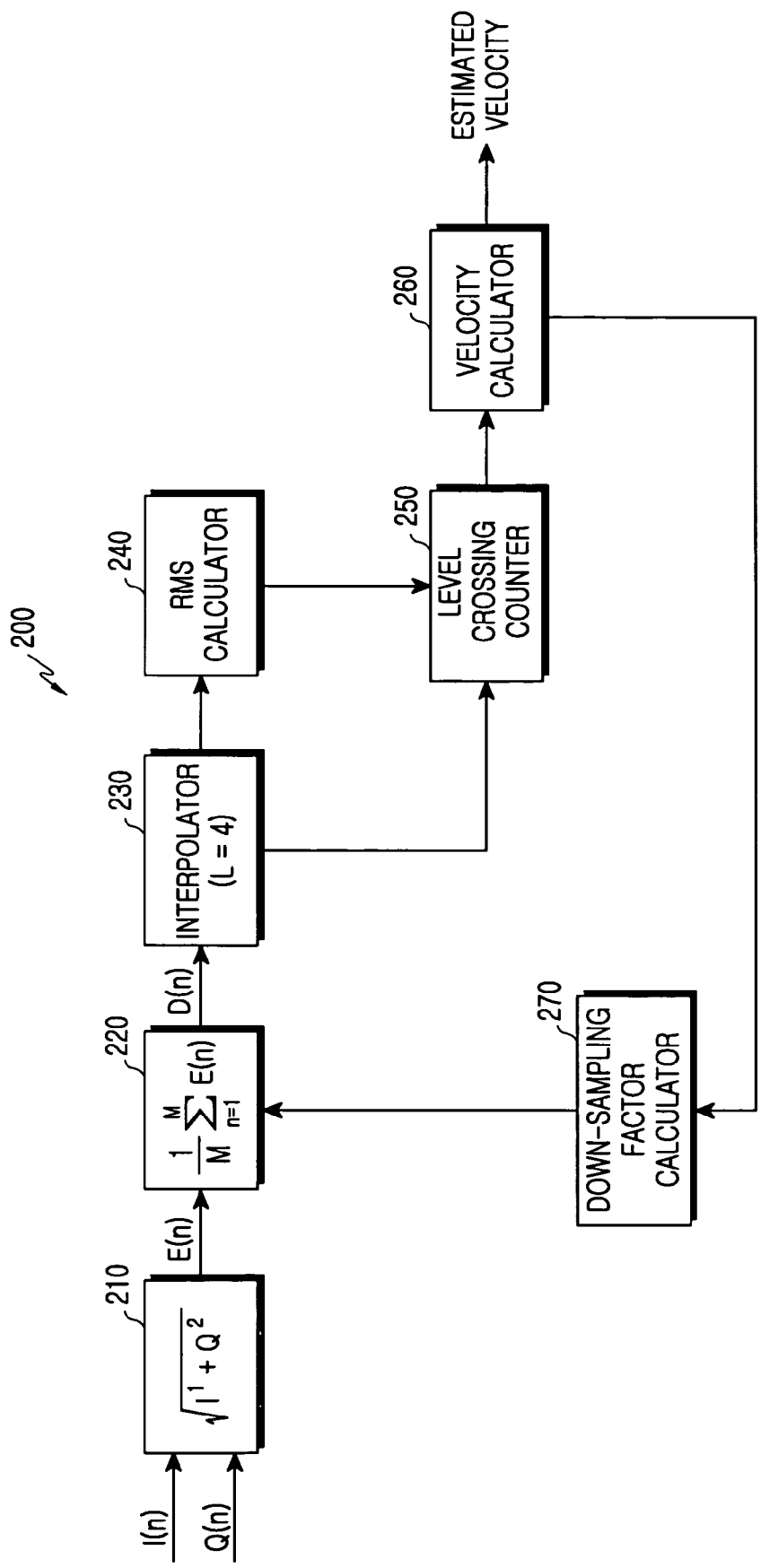
FIG. 5 is a block diagram illustrating a structure of a velocity estimator according to an embodiment of the present invention.

FIG. 5 is a block diagram illustrating a structure of a velocity estimator according to an embodiment of the present invention. Referring to FIG. 5, an in-phase signal component I(n) and a quadrature-phase signal component Q(n) of a complex reception signal input to a velocity estimator 200 are provided to a power calculator 210 which detects an envelope, i.e. power, of a received signal. The power calculator 210 calculates a power value E(n) by taking a square root of the sum of squares of the received signal components.

A mean power calculator 220 calculates a mean power value (Dn) for M power values according to a down-sampling factor M calculated by a down-sampling factor calculator 270. Calculating a mean power value is equivalent to down-sampling a received signal and then calculating a power value of the down-sampled signal. Therefore, in an alternative embodiment, the power calculator 110 and the mean power calculator 220 can be substituted with a down-sampler for down-sampling a received signal according to the down-sampling factor M, and a power calculator for calculating a power value with an output of the down-sampler. A detailed description regarding calculation of the down-sampling factor M will be given later.

An interpolator 230 interpolates mean power values calculated by the mean power calculator 220 according to a predetermined interpolation factor L. An RMS calculator 240 calculates a running root mean square using mean power values interpolated during a predetermined window. The calculated root mean square is used in determining a level crossing threshold used in a level crossing counter 250. In this embodiment, the calculated root mean square directly becomes a level crossing threshold. In an alternative embodiment, a threshold calculator can be added between the RMS calculator 240 and the level crossing counter 250 to calculate a level crossing threshold in various manners. For example, a level crossing threshold can be determined as ½ of the root mean square.

The level crossing counter 250 counts a level crossing frequency indicating how many times mean power values output from the interpolator 230 cross a level crossing threshold determined as the calculated root mean square for a predetermined time period (for example, 0.5 second or 1 second). Taking into consideration processing delay in the RMS calculator 240, a signal used in determining a level crossing threshold in the RMS calculator 240 goes ahead of a signal used in comparing with a level crossing threshold in the level crossing counter 250.

A velocity calculator 260 calculates velocity with the counted level crossing frequency. In this embodiment, the velocity calculator 260 is provided to calculate velocity of a mobile terminal using a level crossing frequency. In an alternative embodiment, however, a look-up table for mapping a velocity estimation value to a level crossing frequency can be used. In this case, the look-up table directly outputs a velocity estimation value in response to the counted level crossing frequency.

The velocity estimation value final output from the velocity calculator 260 is provided to a down-sampling factor calculator 270 so that the down-sampling factor calculator 270 determines a down-sampling factor M of the next time period. The down-sampling factor calculator 270 determines a down-sampling factor M using a previous velocity estimation value so that a Doppler spectrum interval of power becomes as short as possible while no aliasing occurs.

Figure 6A:
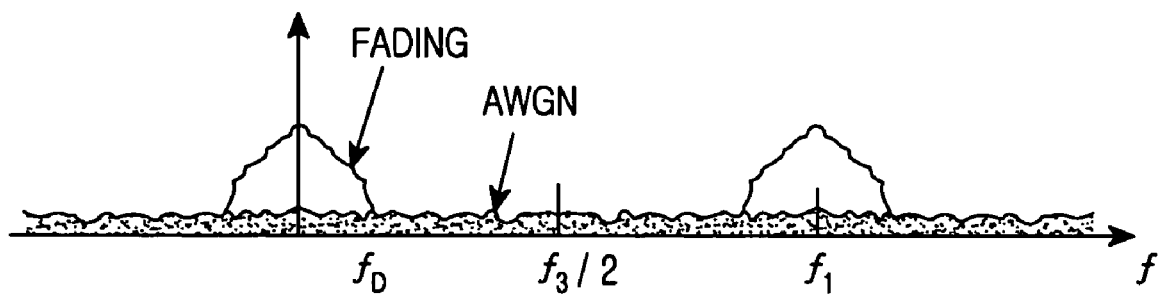
FIGS. 6A and 6B are spectrum waveform diagrams for explaining noise removal by down-sampling according to the present invention.
Figure 6B:
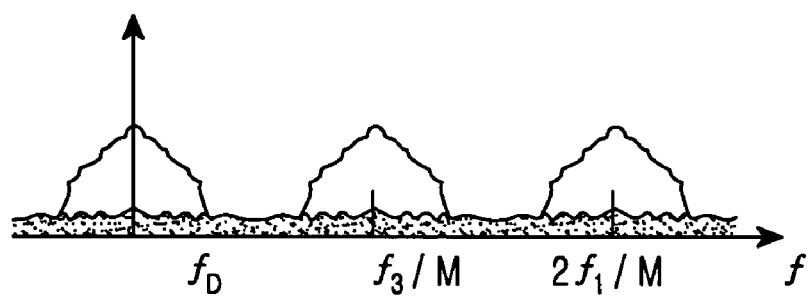

FIGS. 6A and 6B are spectrum waveform diagrams for explaining noise removal by down-sampling according to the present invention. FIG. 6A illustrates a mean power spectrum density of a received signal, and as illustrated, an additive white Gaussian noise (AWGN) appears between sampled power spectrums having a sampling frequency $f_s$ and a Doppler frequency $f_D$. FIG. 6B illustrates a power spectrum density of a down-sampled signal, and as illustrated, it is noted that down-sampled power spectrums having a down-sampling frequency $f_s/M$ and a Doppler frequency $f_D$ are contiguous to one another, thus contributing to a reduction in an influence of AWGN.

Referring to FIGS. 6A and 6B, a down-sampling factor M according to the invention is calculated by Equation (1):

$$M = \left[\frac{f_s}{2f_D}\right] \quad (1)$$

Here, [.] is a rounding-down mark, $f_s$ is a sampling frequency, and $f_D$ is a maximum Doppler frequency.

For 2-dimensional isotropic scattering, a level crossing frequency $L_R$ for Rician fading can be determined by Equation (2):

$$L_R = \sqrt{2\pi(K+1)} f_D \rho e^{-K-(K+1)\rho^2} I_o(2\rho\sqrt{K(K+1)}) \quad (2)$$

$$\rho = \frac{R}{R_{rms}}$$

Here, K denotes a Rician factor indicating a Rician fading characteristic, $f_D$ denotes a Doppler frequency, R denotes a level crossing threshold, $R_{rms}$ denotes a root mean square (rms) value of a power level, $I_o$ means a modified zero-order Bessel function, and e is a natural logarithm. If the level crossing threshold R is set equal to the $R_{rms}$(R=$R_{rms}$), then $\rho=1$. As a result, an influence caused by variation of the Rician factor K becomes negligible.

If Equation (1) is simplified using a velocity formula $v=f_D\lambda_c$, where v is velocity of a mobile terminal, $f_D$ is a Doppler frequency and $\lambda_c$ is a wavelength of a carrier, the velocity $V_{LCR}$ of a mobile terminal is calculated by Equation (3):

$$v_{LCR} = \frac{\lambda_c L_R e}{\sqrt{2\pi}} \quad (3)$$

Figure 7:
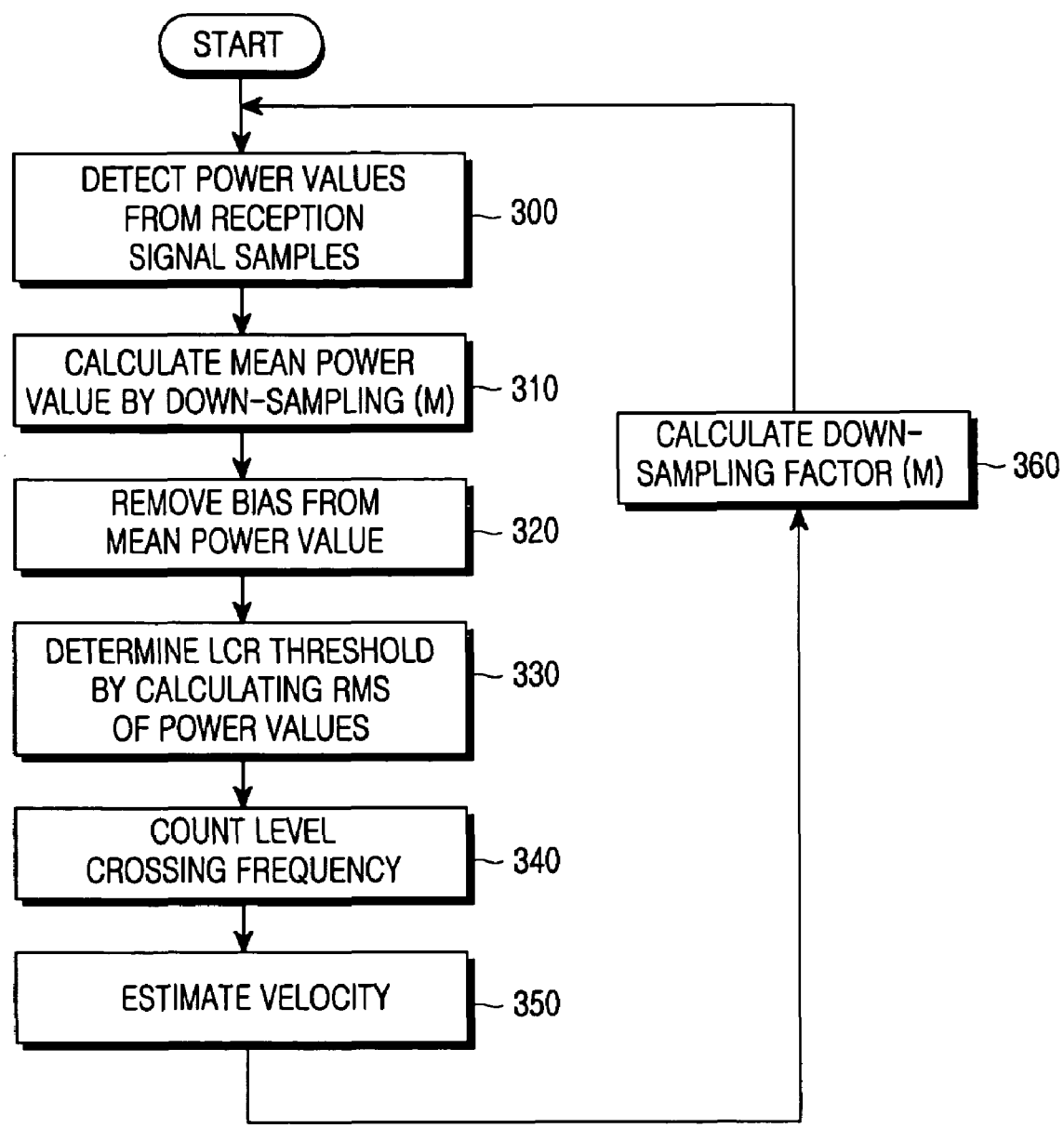
FIG. 7 is a flowchart illustrating a procedure for estimating velocity by the velocity estimator of FIG. 5 according to an embodiment of the present invention.

FIG. 7 is a flowchart illustrating a procedure for estimating velocity of a mobile terminal by the velocity estimator of FIG. 5 according to an embodiment of the present invention. A detailed description of the invention will now be made with reference to FIGS. 5 and 7.

In step 300, the power calculator 210 (FIG. 5) detects an envelope, i.e., power, of a signal on a pilot channel or another channel received from a mobile terminal. Here, a signal on another channel is a constant envelope modulation signal such as a phase shift keying (PSK) modulation signal. In step 310, the mean power calculator 220 (FIG. 5) calculates a mean value of M power values according to a down-sampling factor M calculated for a velocity value estimated with a previous reception signal. Through the calculation, it is possible to obtain new mean values having a decreased sampling rate.

The calculation in step 310 is provided to remove an influence of noise, but bias occurs due to a difference between a continuous signal and a discrete signal. In order to remove such a phenomenon, in step 320, the interpolator 230 performs interpolation on down-sampled power values, thereby again increasing the sampling rate.

Figure 8A:
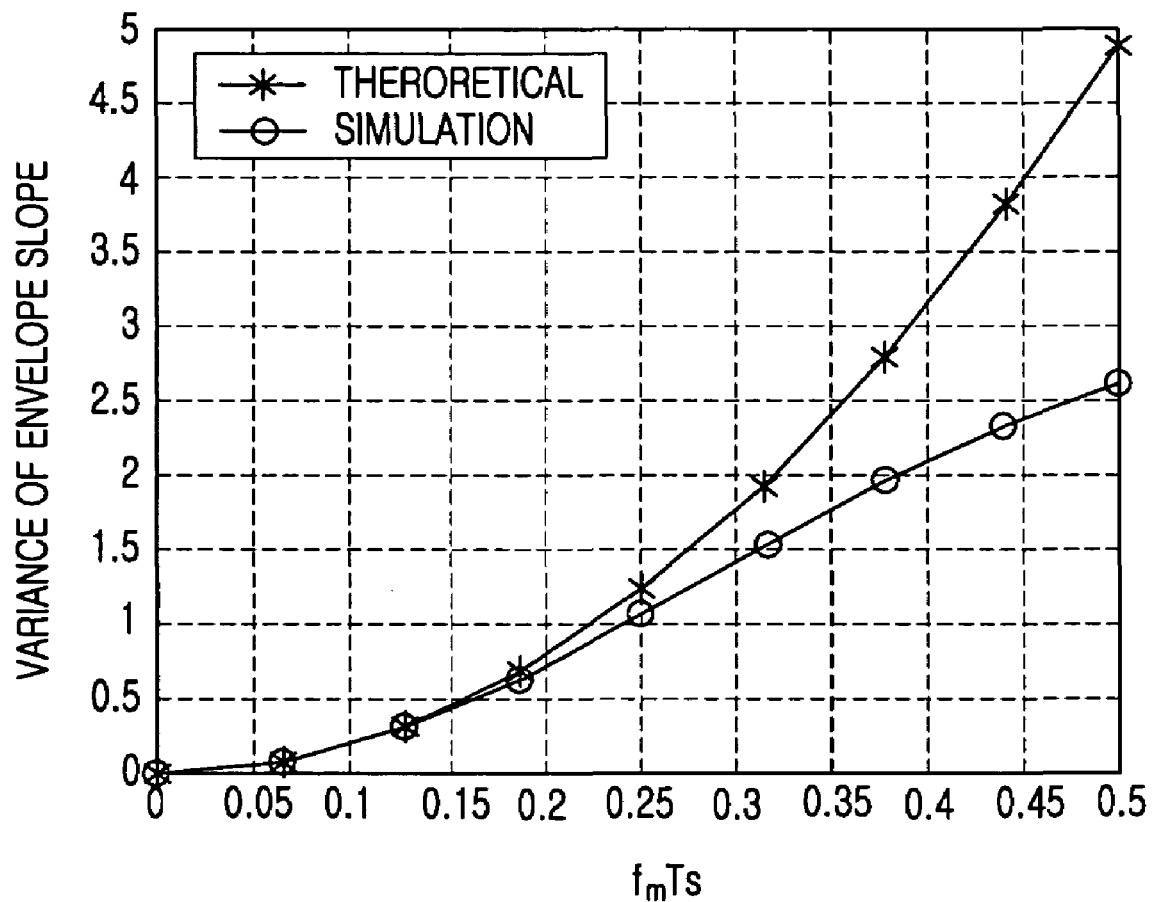
FIGS. 8A and 8B are diagrams for explaining the results of interpolation according to the present invention.
Figure 8B:
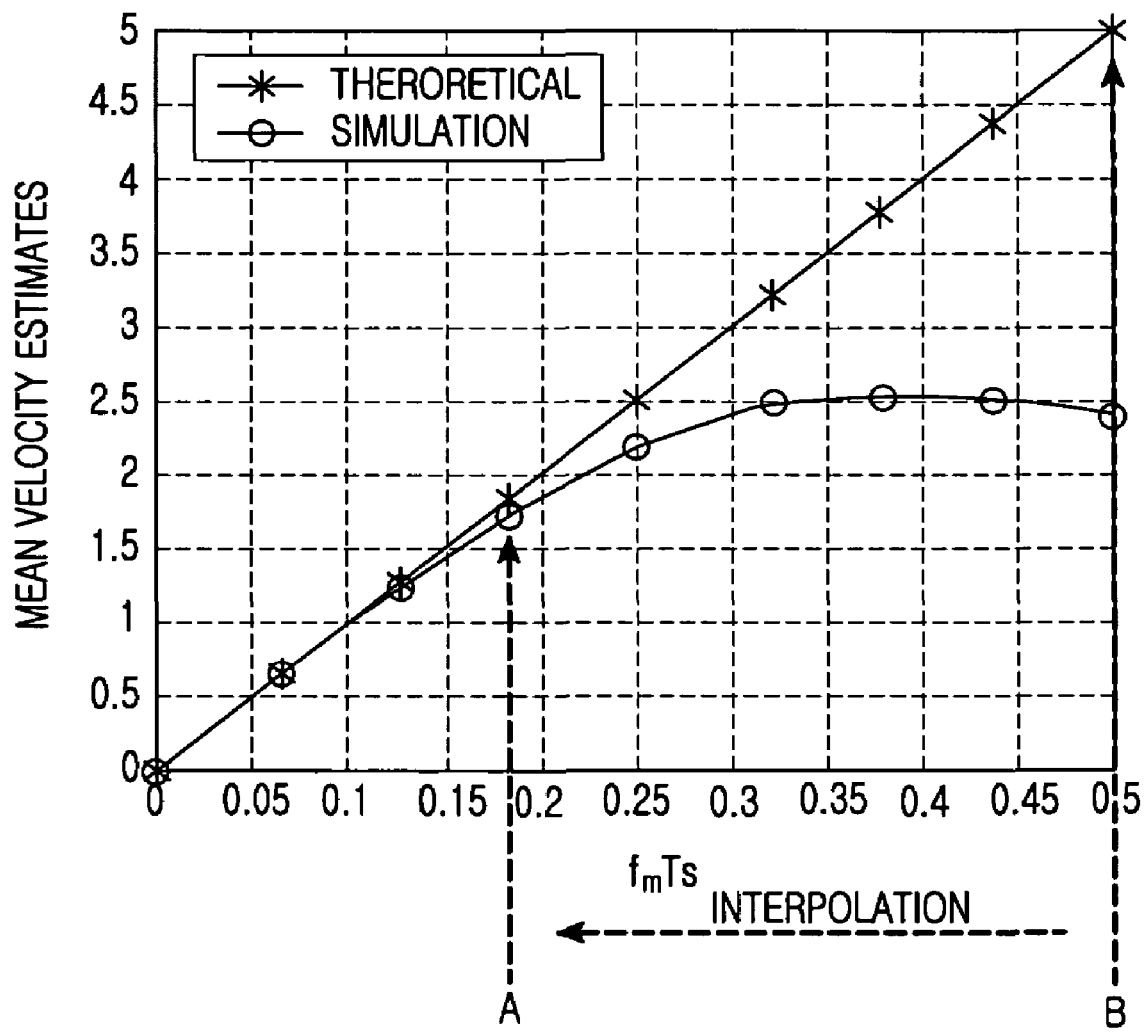

FIGS. 8A and 8B are diagrams for explaining the results of interpolation according to the present invention. FIG. 8A illustrates envelope slope characteristics of a continuous signal (represented by "Theoretical" legend) and a discrete signal (represented by "Simulation" legend), both being responsive to a Doppler frequency $f_D$ standardized at a sampling period $T_S$. FIG. 8B illustrates mean velocity estimation values of a continuous signal and a discrete signal. As illustrated, typical $f_D T_S$ is about 0.125, so that velocity estimation values of a continuous signal and a discrete signal are almost equal to each other. However, if $f_D T_S$ is increased due to down-sampling, a difference in velocity estimation values between a continuous signal and a discrete signal is also increased.

In the invention using a discrete signal, an error of a velocity estimation value is decreased by reducing an operating point of $f_D T_S$ from B to A by interpolation. Here, it is preferable that an interpolation ratio L becomes at least 4 so that an error of velocity estimation values between a continuous signal and a discrete signal becomes ignorable. However, for simplicity of structure, the interpolation ratio L is set to 2, and even in this case, the error can be reduced to some extent.

Referring back to FIGS. 5 and 7, in step 330, the RMS calculator 240 (FIG. 5) calculates a root mean square value with power values down-sampled and interpolated at a previous cycle in order to determine a threshold value for level crossing count. For example, in order to remove an influence of Rician fading, a level crossing threshold is set equal to the root mean square value.

In step 340, the level crossing counter 250 (FIG. 5) counts a level crossing frequency indicating how many times an output of the interpolator 230 (FIG. 5) crosses the determined level crossing threshold. The frequency becomes a level crossing frequency. It will be assumed that an interval between periods where level crossing happens is called "duration D of level crossing." Then, in a general case, reciprocal distribution having a low value (i.e., distribution of 1/D) mostly occurs in the level crossing duration, whereas in a noisy case, reciprocal distribution having a high value occurs even in the level crossing duration. That is, in a noisy environment, since variation in signal power is high, level crossing durations occur frequently. Therefore, the level crossing counter 250 (FIG. 5) calculates a time, i.e., a level crossing duration, from a previous level crossing time each time level crossing occurs, and disregards the occurred level crossing if the level crossing duration is shorter than a predetermined value. That is, the level crossing counter 250 (FIG. 5) does not count a level crossing frequency. In an ideal case, due to the down-sampling and interpolation, reciprocal distribution in the level crossing duration almost equally occurs regardless of velocity.

In step 350, the velocity calculator 260 (FIG. 5) calculates velocity of a mobile terminal by substituting the level crossing frequency counted in the step 340 in Equation (3). In step 360, the down-sampling factor calculator 270 (FIG. 5) calculates a down-sampling factor M to be used at the next cycle, using the calculated velocity. The down-sampling factor is a value determined so that Doppler spectrum distribution of reception signal power is maximally dense to the extent that no aliasing occurs.

Figure 9:
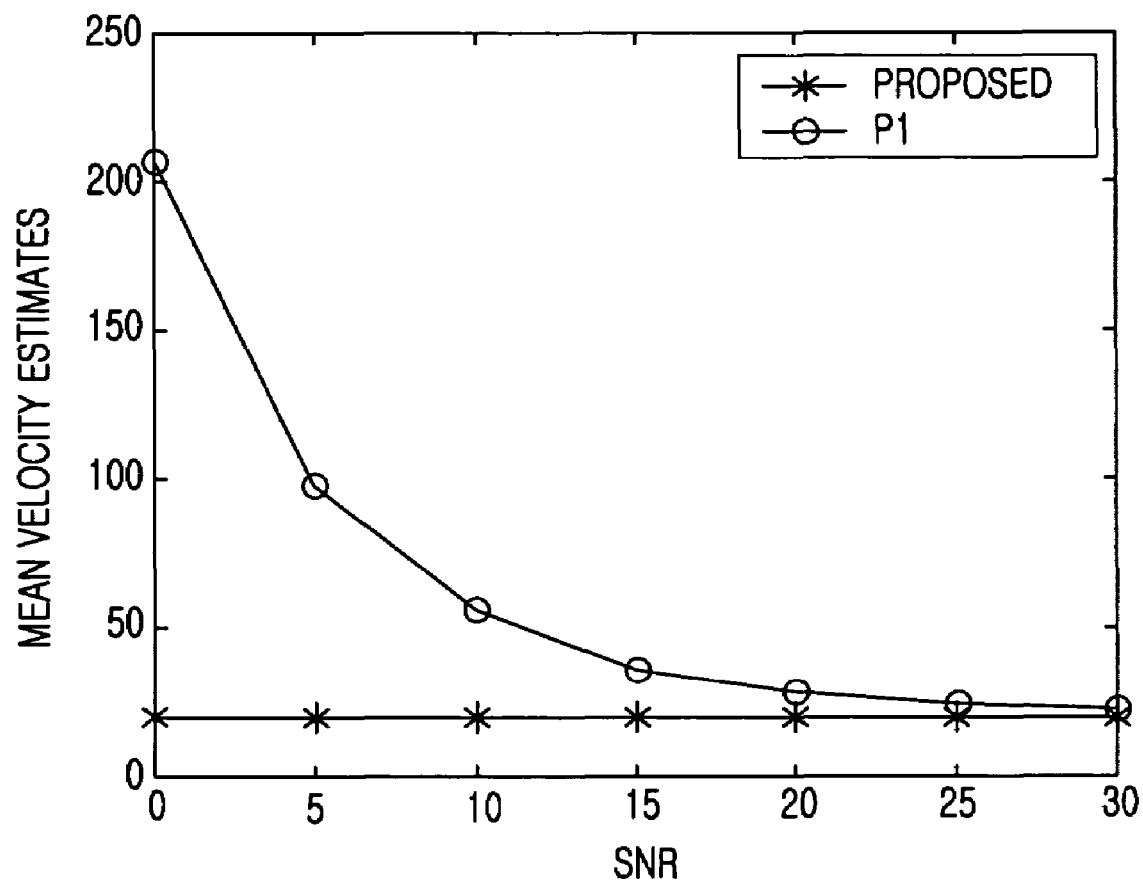
FIGS. 9 and 10 are diagrams for comparing mean velocity estimation performance according to the invention and that of the conventional technology shown.
Figure 10:
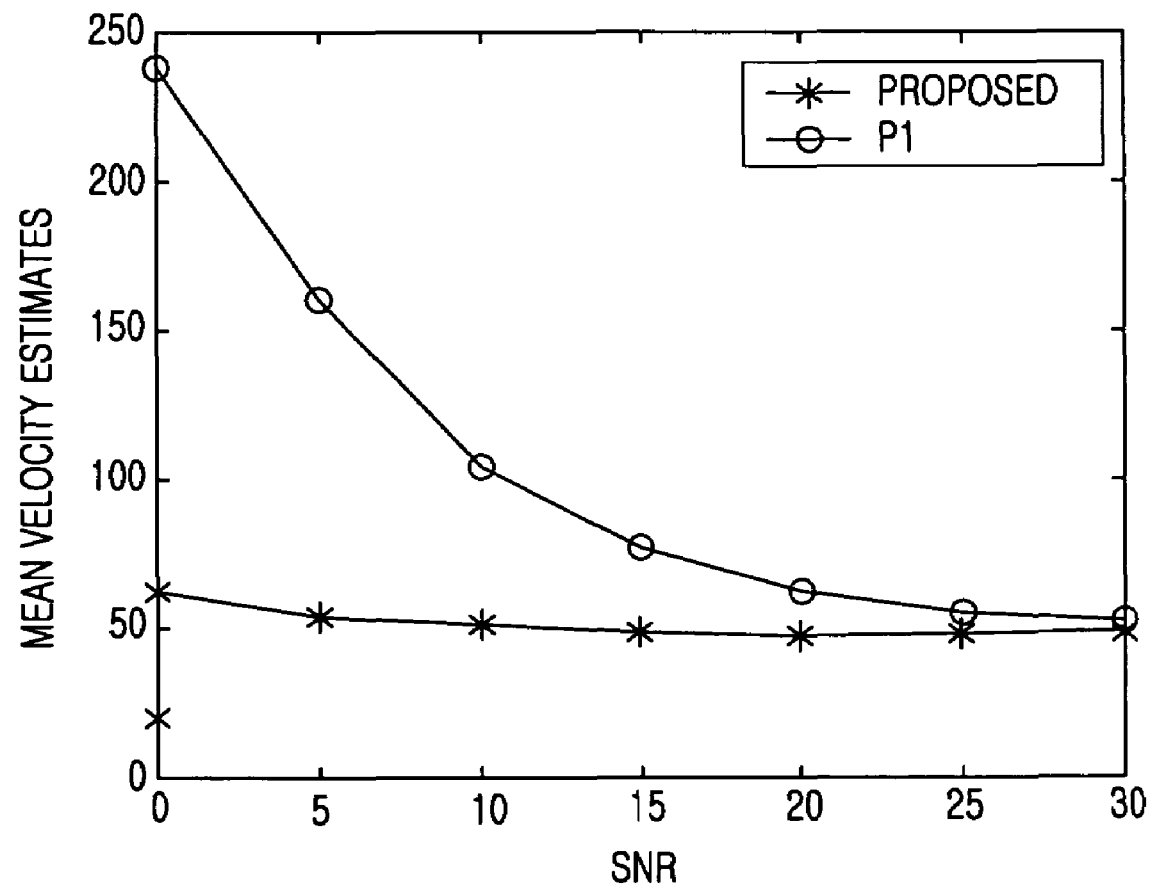
Figure 11:
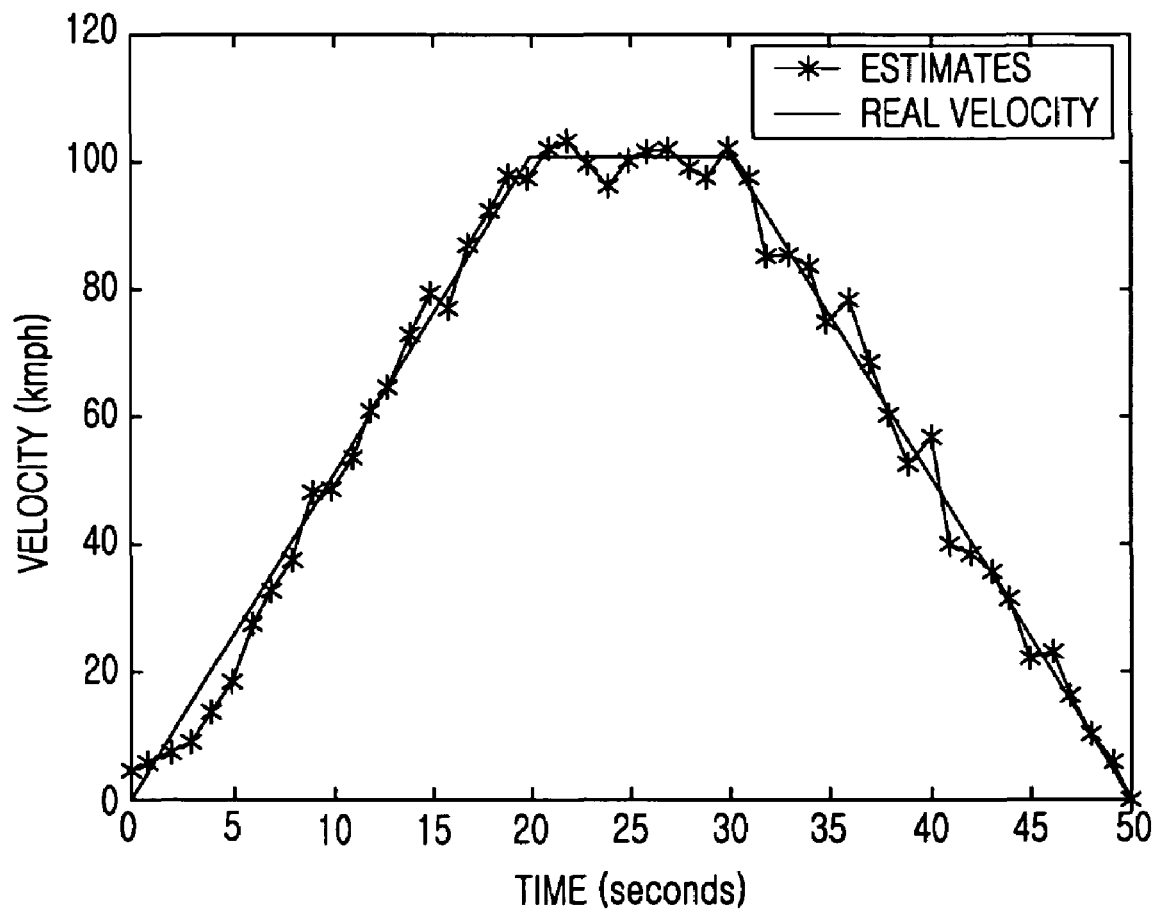
FIG. 11 is a diagram illustrating tracking performance of mean velocity according to the present invention when velocity varies with the passage of time.

FIGS. 9 to 11 illustrate simulation results according to the present invention, wherein an Orthogonal Frequency Division Multiplexing (OFDM) system using a frequency bandwidth of 5 GHz, a sampling frequency of 8 KHz, one fading path, 256 sub-carriers was used, and a pilot tone was used for envelope detection.

FIGS. 9 and 10 are graphs comparing mean velocity estimation performance according to the invention and that of the conventional technology shown in FIG. 3 at actual velocity of 20 Km per hour and 100 Km per hour, respectively. As illustrated, the invention shows improved accuracy at a lower SNR as compared with the conventional technology, for both the relatively low velocity of 20 Km/h and the relatively high velocity of 100 Km/h.

FIG. 11 is a graph illustrating tracking performance of mean velocity according to the present invention when velocity varies with the passage of time. Herein, velocity estimation is performed every second, and as illustrated, the invention accurately tracks velocity variation in a 10 dB-SNR environment.

The velocity estimator and velocity estimation method according to the present invention, detects information on an operation environment of a mobile terminal by enabling accurate velocity estimation, and provides the detected velocity information to a mobile communication system. The mobile communication system then determines whether a mobile terminal will access a mobile service or a fixed service guaranteeing a high-speed data service, based on the velocity information. The fixed service provides a high-speed multimedia service by making the best use of an adaptive modulation scheme by utilizing time fixation of a channel, while the mobile service utilizes only an adaptive modulation scheme with a simple structure, being capable of guaranteeing a minimum data rate that meets a user's demand.

In assigning resources, a mobile communication system considers a system environment of a microcell when a mobile terminal has low velocity, and considers system environment of a macrocell when the mobile terminal has high velocity, thereby maximizing channel capacity. In addition, through velocity estimation, it is possible to efficiently perform handoff according to velocity of a user.

The invention has the following advantages. That is, the invention calculates a velocity parameter by means of a level crossing rate (RLC) estimator that stably operates in various channel environments, thereby contributing to a remarkable reduction in an influence of noise which was a main drawback of the existing velocity estimation algorithm, without an increase in complexity. That is, it is possible to reduce an influence of noises in any radio channel environment without a burden of high complexity, contributing to accurate velocity calculation.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A velocity estimator using a level crossing rate, comprising:

a power calculator for calculating power values of a signal received from a mobile terminal;

a mean power calculator for calculating mean power values for M power values according to a predetermined down-sampling factor M;

an interpolator for interpolating the mean power values according to a predetermined interpolation ratio L;

a root mean square calculator for calculating a root mean square value using an output of the interpolator;

a level crossing counter for counting a level crossing frequency representing how many times the output of the interpolator crosses a level crossing threshold determined according to the root mean square value, for a predetermined time period; and a velocity calculator for calculating a velocity estimation value of the mobile terminal using the level crossing frequency.

2. The velocity estimator of claim 1, further comprising a down-sampling factor calculator for determining with the velocity estimation value a down-sampling factor M for a next time period so that an interval between Doppler spectrums of reception signal power can be minimized while no aliasing occurs, and providing the determined down-sampling factor M to the mean power calculator.

3. The velocity estimator of claim 2, wherein the down-sampling factor M is calculated by $$M = \left[\frac{f_s}{2f_D}\right]$$

where $f_s$ is a sampling frequency and $f_D$ is a maximum Doppler frequency.

4. The velocity estimator of claim 1, wherein the interpolation ratio L is at least 4.

5. The velocity estimator of claim 1, wherein the level crossing counter determines, upon occurrence of level crossing, whether a level crossing duration representing a time interval between a current level crossing time and a previous level crossing time is shorter than a predetermined value, and disregards the occurred level crossing in order not to count the level crossing frequency if the level crossing duration is shorter than the predetermined value.

6. The velocity estimator of claim 1, wherein the level crossing threshold is set equal to the root mean square value.

7. The velocity estimator of claim 1, wherein the velocity estimation value is calculated by $$v_{LCR} = \frac{\lambda_c L_R e}{\sqrt{2\pi}}$$

where $v_{LCR}$ is the velocity estimation value, $\lambda_c$ is a wavelength of a carrier, $L_R$ is the level crossing frequency, and e is a natural logarithm.

8. A velocity estimator using a level crossing rate, comprising:
a down-sampler for down-sampling a signal received from a mobile terminal according to a predetermined down-sampling factor M;
a power calculator for calculating power values of the down-sampled signal;
an interpolator for interpolating the power values according to a predetermined interpolation ratio L;
a root mean square calculator for calculating a root mean square value using an output of the interpolator, wherein the root mean square value becomes a level crossing threshold;
a level crossing counter for counting the level crossing frequency representing how many times the output of the interpolator crosses the level crossing threshold for a predetermined time period; and
a velocity calculator for calculating a velocity estimation value of the mobile terminal using the level crossing frequency.

9. The velocity estimator of claim 8, further comprising a down-sampling factor calculator for determining with the velocity estimation value a down-sampling factor M for a next time period so that an interval between Doppler spectrums of reception signal power can be minimized while no aliasing occurs, and providing the determined down-sampling factor M to the down-sampler.

10. The velocity estimator of claim 9, wherein the down-sampling factor M is calculated by $$M = \left[\frac{f_s}{2f_D}\right]$$

where $f_s$ is a sampling frequency and $f_D$ is a maximum Doppler frequency.

11. The velocity estimator of claim 8, wherein the interpolation ratio L is at least 4.

12. The velocity estimator of claim 8, wherein the level crossing counter determines, upon occurrence of level crossing, whether a level crossing duration representing a time interval between a current level crossing time and a previous level crossing time is shorter than a predetermined value, and disregards the occurred level crossing in order not to count the level crossing frequency if the level crossing duration is shorter than the predetermined value.

13. The velocity estimator of claim 8, wherein the level crossing threshold is set equal to the root mean square value.

14. The velocity estimator of claim 8, wherein the velocity estimation value is calculated by $$v_{LCR} = \frac{\lambda_c L_R e}{\sqrt{2\pi}}$$

where $v_{LCR}$ is the velocity estimation value, $\lambda_c$ is a wavelength of a carrier, $L_R$ is the level crossing frequency, and e is a natural logarithm.

15. A velocity estimation method using a level crossing rate, comprising the steps of:
calculating power values of a signal down-sampled with a signal received from a mobile terminal;
interpolating the power values according to a predetermined interpolation ratio;
calculating a root mean square value using the interpolated values, wherein the root mean square value becomes a level crossing threshold;
counting a level crossing frequency representing how many times the interpolated values cross the level crossing threshold for a predetermined time period; and
calculating a velocity estimation value of the mobile terminal using the level crossing frequency.

16. The velocity estimation method of claim 15, wherein the step of calculating power values of a down-sampled signal comprises the step of calculating power values of a signal received from the mobile terminal, and calculating mean power values for M power values according to a predetermined down-sampling factor M, wherein the mean power values become power values of the down-sampled signal.

17. The velocity estimation method of claim 15, wherein the step of calculating power values of a down-sampled signal comprises the step of down-sampling a signal received from the mobile terminal according to a predetermined down-sampling factor M, and calculating power values of the down-sampled signal.

18. The velocity estimation method of claim 15, further comprising the step of determining with the velocity estimation value a down-sampling factor M for a next time period so that an interval between Doppler spectrums of reception signal power can be minimized while no aliasing occurs.

19. The velocity estimation method of claim 15, wherein the down-sampling factor M is calculated by $$M = \left[\frac{f_s}{2f_D}\right]$$

where $f_s$ is a sampling frequency and $f_D$ is a maximum Doppler frequency.

20. The velocity estimation method of claim 15, wherein the interpolation ratio L is at least 4.

21. The velocity estimation method of claim 15, wherein the counting step comprises the step of determining, upon occurrence of level crossing, whether a level crossing duration representing a time interval between a current level crossing time and a previous level crossing time is shorter than a predetermined value, and disregarding the occurred level crossing in order not to count the level crossing frequency if the level crossing duration is shorter than the predetermined value.

22. The velocity estimation method of claim 15, wherein the level crossing threshold is set equal to the root mean square value.

23. The velocity estimation method of claim 15, wherein the velocity estimation value is calculated by $$v_{LCR} = \frac{\lambda_c L_R e}{\sqrt{2\pi}},$$

where $v_{LCR}$ is the velocity estimation value, $\lambda_c$ is a wavelength of a carrier, $L_R$ is the level crossing frequency, and e is a natural logarithm.

* * * * *